Figure 1:
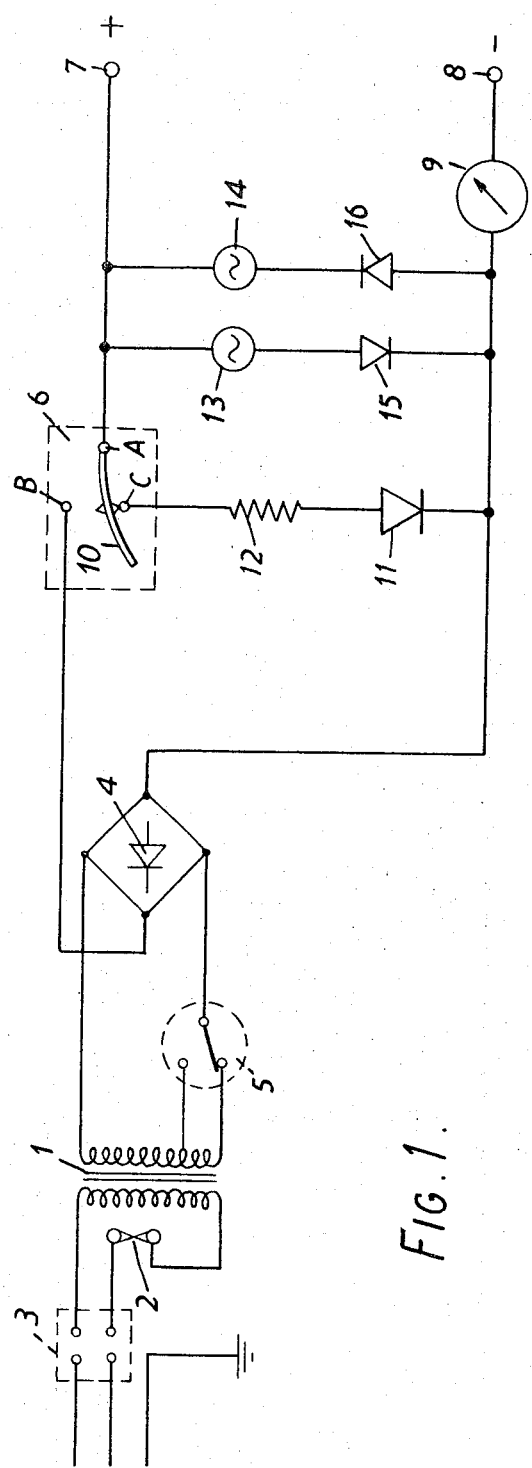

United States Patent [19]
Wheeler

[11] 3,809,993
[45] May 7, 1974

[54] ELECTRIC BATTERY CHARGER
[75] Inventor: Frederick Charles Wheeler, Bath, England
[73] Assignee: Staples Developments Limited, London, England
[22] Filed: Dec. 13, 1972
[21] Appl. No.: 314,773

[30] Foreign Application Priority Data
Dec. 17, 1971 Great Britain.................... 58704/71

[52] U.S. Cl......................... 320/25, 320/36, 320/40
[51] Int. Cl.............................................. H02j 7/04
[58] Field of Search............... 320/2, 25, 26, 35, 36, 320/39, 40

[56] References Cited
UNITED STATES PATENTS

| | | | |
|---|---|---|---|
| 3,051,887 | 8/1962 | Lind | 320/25 |
| 3,659,183 | 4/1972 | Carlson | 320/25 |
| 3,564,383 | 2/1971 | Wheeler | 320/35 |

Primary Examiner—J. D. Miller
Assistant Examiner—Robert J. Hickey
Attorney, Agent, or Firm—Frank J. Jordan

[57] ABSTRACT

A battery charger incorporating an electric current heated thermo-operated switch which prevents the passage of charging current to a bettery connected to the charger the wrong way round, and acts to disconnect a battery intermittently when fully charged, when connected to right way round.

12 Claims, 3 Drawing Figures

ELECTRIC BATTERY CHARGER

THE INVENTION

THIS INVENTION relates to electric battery chargers and in particulars to means for preventing damage to a battery charger due to incorrect connection to a battery.

The most common mistake made by a user of a charger is to connect the battery the wrong way round and it has been common practice in the past to protect a charger from damage by providing a fuse or an overload cut-out, but both these systems rely upon a heavy reverse current from the battery, and a malfunctioning of either can seriously damage the charger. Ideally the transformer and rectifier should remain disconnected from the battery until the battery is connected the right way round, and this in the past has been accomplished using a relay operated by a polarity sensitive diode. However, in small chargers a relay is too expensive, and one object of the present invention is to achieve the same result more economically, and another object is to provide a more efficient charger than heretofore.

The invention consists in a battery charger having a source of charging current, a pair of terminals for connection of a battery to be charged to the charger, and means to prevent the passage of charging current when a battery is connected to the terminals the wrong way round, the improvement in that the means to prevent said passage of charging current comprises an electric current heated thermo-operated switch acting as a two-way switch, which, when cold, closes a first circuit between the battery charging terminals by way of a diode and a current limiting device, and when hot opens said first circuit and closes a second circuit between a battery charging terminal and the source of charging current, the presence of the diode preventing the passage of current from the battery to operate the switch when the battery is connected the wrong way round and permits the operation of the switch by current drawn from the battery when the battery is connected the right way round.

The invention further consists in a battery charger as set forth in the preceding paragraph in which the thermo-operated switch is a bi-metallic switch heated by a current passing through the switch, in which the current at which the switch breaks the said second circuit is that which passes when the battery is fully charged.

The invention still further consists in a battery charger as set forth above in which there is more than one path for the simultaneous passage of charging current between said source and said terminal, one of which is of substantially greater resistance than the other or another path, said path of substantially greater resistance constituting said second circuit, whereby the thermo-operated switch in said path of substantially greater resistance is influenced by and passes only a portion of the total charging current.

The invention still further consists of a battery charger as set forth in the preceding paragraph in which there are two paths and there is provided a relay, the energising coil of which is connected in the path of substantially greater resistance, while the contacts of the relay are connected in the path of lower resistance.

The invention still further consists in a battery charger as set forth above in which there are two paths for the simultaneous passage of charging current, and there is provided a further electric current heated thermo-operated switch acting as a two-way switch, which when cold connects the source of charging current with said second circuit by way of a resistor, and when hot connects the source of charging to said terminal by way of said resistor to establish the path of relatively low resistance, while the path of relatively high resistance is by way of a resistor between said source of charging current and the first mentioned thermo-operated switch and said second circuit.

SPECIFIC EMBODIMENT

Figure 2:
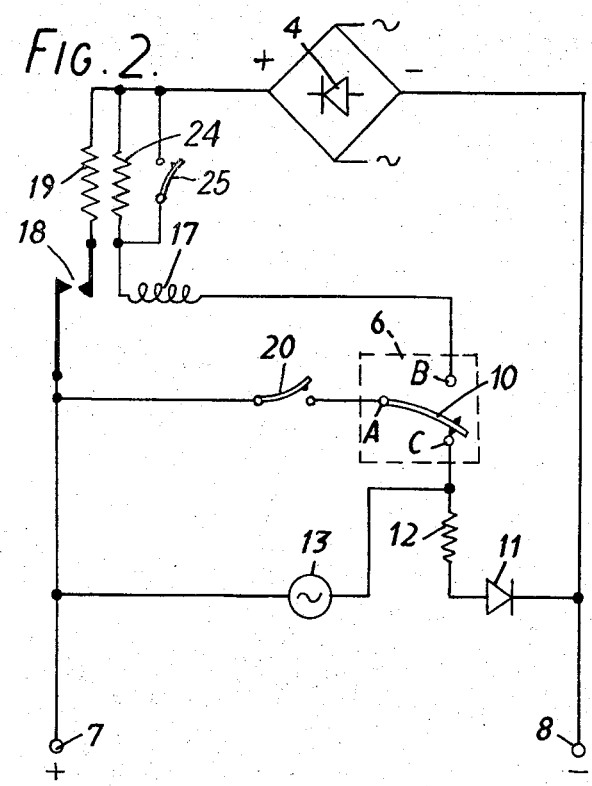
Figure 3:
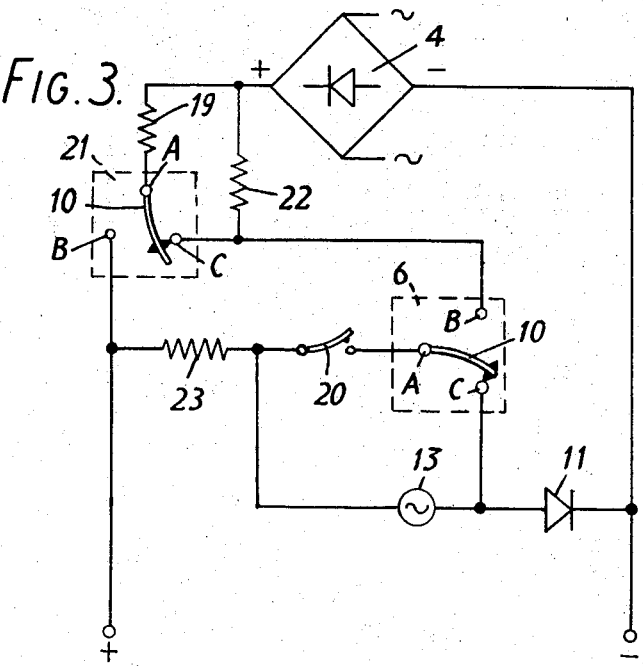

The accompanying drawings show, by way of example only, three embodiments of the invention in which:

FIG. 1 is a circuit diagram of a simple battery charger constructed in accordance with the invention, FIG. 2 is a circuit diagram of battery charger as shown in FIG. 1 but modified by the incorporation of a relay which augments the operation of the bi-metallic cut-out of FIG. 1, while FIG. 3 is a circuit diagram of a further battery charger as shown in FIG. 1 modified by the incorporation of a further bi-metallic switch which augments the bi-metallic switch of FIG. 1.

The charger as shown in FIG. 1 comprises a transformer 1 the primary winding of which is connected by way of a fuse 2 to a mains inlet connection 3. The inlet to the rectifier 4 is fed with A.C. from one end of the secondary winding of the transformer and either of two voltages from the end of the secondary of the transformer or a tapping by means of the switch 5, for 12 volt or 6 volt batteries respectively.

The positive D.C. outlet of the rectifier 4 is connected to contact B of the bi-metallic switch 6, while the terminal A of the switch 6 goes to the positive terminal 7 for the battery. The negative D.C. outlet of the rectifier 4 is connected directly to the negative terminal B for the battery. The meter 9 may be inserted in this connection for a reason to be referred to later. The bi-metallic switch 6 has a bi-metallic strip 10 fastened to the terminal A and which in the cold condition assumes the position shown in the drawing and an electrical connection is established between the contact C and the terminal A. Between the contact C and the connection with the negative battery terminal 8 is provided a diode 11 in series with a resistor 12 or other current or limiting device, the diode being connected that way round that if the battery to be charged is correctly connected to the terminals 7 and 8 a current will flow through the bi-metallic strip 10. If the battery is incorrectly connected no current will flow through the bi-metallic strip 10.

A correct connection having been made the current flowing through the bi-metallic strip, or a heating winding associated therewith, bends into an upper position in which contact is made with the upper contact B and connection is established between the rectifier positive outlet and the positive battery terminal 7. When no battery is connected, or a battery is connected the wrong way round the rectifier remains isolated, while if a battery is connected the right way round a connection to the rectifier is established. The current limiting resistor 12 limits the current through the bi-metallic strip 10 to a suitable value.

By choosing a suitable high resistance for the bi-metallic strip, or its heating winding, the strip can be kept hot by the charging current and it can be so arranged that it remains in contact with contact B until the charging current has fallen to a predetermined value. By arranging the fall off of charging current so that the predetermined value occurs when the battery has reached its terminal voltage the charger can be made to pulse, as a heavy but very brief discharge of the battery will occur through the resistor 12 so heating the strip of the cut-out and switching the charger on again and an equilibrium is reached.

In consequence it can be arranged that when the battery is fully charged the battery will alternately be charged and discharged by a small amount of current, which is an ideal situation, as thereby the charger may be left connected to the battery without danger of overcharging the battery.

Increased control of the switching process may be achieved by changing the mounting position of the bi-metallic cut-out at different distances from a source of heat such as the transformer, rectifier, diodes current limiting device so as to effect the behaviour of the bi-metallic strip.

Whether or not the battery is correctly connected can be indicated by providing, for example, a green coloured indicating lamp 13 and a red indicating lamp 14 connected across the battery terminals 7, 8, in series each with a diode 15, 16 connected the suitable way round, so that when the battery is properly connected the green light lights and when improperly connected the red light lights. The green light will then pulse when the cut-out starts cycling thus indicating that the battery is fully charged.

A meter 9 may be substituted for the indicating lamps 13 and 14 if desired, and serves the same purpose.

If desired the diode 15 can be dispensed with by taking the lower connection from the light 13 to the connection between the resistor 12 and the diode 11.

In both the arrangements of FIGS. 2 and 3 the charging current is made to follow two paths of unequal resistance, so that substantially more current flows by one path than the other. The thermo-operated switch 6 is connected in the path of higher resistance. Control of the charger is therefore effected in a low current circuit, the control being reflected in the high current circuit. This is carried out by using the bi-metallic switch to drive a relay (FIG. 2) or even another but heavier rated bi-metallic switch (FIG. 3).

FIG. 2 shows a working arrangement using a first bi-metallic switch 6 to drive a relay coil 17. When a battery is connected incorrectly there is no circuit due to diode 11, but when the battery is connected correctly diode 11 conducts and the blade of the bi-metallic switch 6 conducts and self-heats so switching over to make contact B. The initial current at this stage is limited to an acceptable value by resistor 12. The charger is then feeding current to the battery through the relay coil 17 so switching on the main relay contacts 18.

In order to divide the charging current between the path by way of the contacts 18 and the paths by way of the coil 17 so that the current by way of the former is substantially greater than that by way of the later, the resistors 19 and 24 are inserted, the resistor 19 of very low value providing a path of low resistance while the resistor 24 is of higher value but such as to keep enough current flowing through the coil to hold the relay contacts 18 on by keeping the blade of the bi-metallic switch hot enough to stay in the on mode during the normal charging of the battery. As in the construction of FIG. 1, the charger can be made to cycle on and off once the battery has reached a predetermined voltage by arranging the current flowing through the bi-metallic switch 6 to fall below the value necessary to keep it in the on mode. Heat from the resistors or other heat sources can be used to augment this control.

A light duty thermal overload cut-out 20 may be connected to in series with the blade of the bi-metallic switch 6 to protect the unit should the charger be short circuited while the switch 6 is in the on mode, and also to provide overload protection to the charger as a whole by reflecting the heavier current flowing by way of the contacts 18.

To enable the relay coil to operate over a wide range of voltage e.g. in chargers for 6, 12 and 24 volts there is included a further thermal cut-out 25 across the resistor 24, heated by the rise in temperature of the coil 17 so that once it has reached a predetermined working temperature the cut-out 25 opens and the resistor 24 is introduced in series with the coil. This arrangement ensures firstly that there is adequate current to operate the relay under all circumstances, quickly, and that when the voltage falls the relay is held closed until the bi-metallic swicth 6 opens the circuit by way of the coil 17 when the battery is charged, as previously described.

The resistance of the paths by way of the contacts of the relay on FIG. 2 or the path by way of the second bi-metallic switch in FIG. 3 may be substantially less than the path by way of the first bi-metallic switch, so that the charging current by way of the former may, for example, be four or five times that by way of the latter.

FIG. 3 shows another arrangement whereby the first bi-metallic switch 6, drives a second bigger heavy duty bi-metallic switch 21. The initial operation is as before, but this time when the first bi-metallic cut-out 6 switches over the charger itself feeds a much heavier current through the second bi-metallic cut-out 21, so causing it to switch and charge the battery directly, and its own major proportion of the charging current keeps it hot and in the on mode. In order that the bi-metallic switch 6 should carry its lesser proportion of the charging current a resistor 22 is arranged to feed enough current to the first bi-metallic cut-out 6 to keep this in the on mode. As the battery increases in voltage the charging rate naturally falls due to the regulation of the transformer and rectifier, and at a certain point (chosen when the battery has reached terminal voltage) the second bi-metallic cut-out 21 releases so that a trickle charge is left through the first bi-metallic cut out which can be controlled by resistor 23. Finally, the charge rate is reduced further until the first bi-metallic cut-out cycles on and off alternately charging and discharging the battery through resistor 23 so keeping the battery in stable equilibrium at full charge.

The invention may be used with any charger whether on full bridge rectification or with centre tap transformer or other modifications for controlling the charging current or voltage selection while other details for carrying the invention into effect may be varied without departing from the scope of the invention claimed.

I claim:

1. A battery charger comprising a source of unidirectional charging current, a first battery connecting terminal for connection of the charger to one terminal of a battery to be charged; a second battery connecting terminal for connection of the charger to the other terminal of the battery to be charged; a first circuit including in series said first battery connecting terminal, an electric current heated thermo-operated two-way switch, a diode, a current limiting device, and said second battery connecting terminal; a second circuit including an electrical connection between said first battery connecting terminal and one side of said source of charging current and in which said two-way switch is included, said second circuit also including an electrical connection between the other side of said source of charging current and said second battery connecting terminal independent of said two-way switch; said two-way switch being operable such that when cold, said two-way switch completes said first circuit and when hot opens said first circuit and closes said second circuit, said diode being connected such way round as to prevent operation of said two-way switch when a battery is connected to the battery connecting terminals the wrong way.

2. A battery charger as claimed in claim 1 in which the thermo-operated switch is a bi-metallic switch heated by a current passing through the switch, said switch being operable to open said second circuit when the current which passes is that when the battery is fully charged.

3. A battery charger as claimed in claim 1 in which there is provided more than one path for the simultaneous passage of charging current between said one side of said source of charging current and said first battery connecting terminal, one of which is of substantially greater resistance than the other path, said path of substantially greater resistance constituting said second circuit, whereby the thermo-operated switch in said path of substantially greater resistance is influenced by and passes only a portion of the total charging current.

4. A battery charger as claimed in claim 3 in which there are two paths and there is provided a relay having an energising coil, said energising coil being connected to the path of substantially greater resistance, while the contacts of the relay are connected in the path of lower resistance.

5. A battery charger as claimed in claim 4 in which a resistor is connected in each of the two paths the values of which are so chosen that the charging current flowing by way of the coil is substantially less than that flowing by way of the contacts.

6. A battery charger as claimed in claim 5 in which there is provided a thermally operated switch across the resistor in the path including the coil, which is normally closed, and which opens due to rise in temperature of the coil above a predetermined value.

7. A battery charger as claimed in claim 3 in which there are provided two paths for the simultaneous passage of charging current, a plurality of resistors, a further electric current heated thermo-operated switch acting as a two-way switch, which when cold connects the source of charging current with said second circuit by way of one of said resistors and when hot connects the source of charging current to said first battery terminal by way of said resistor to establish the path of relatively low resistance, while the path of relatively high resistance is by way of another resistor between said source of charging current and the first mentioned thermo-operated switch in said second circuit.

8. A battery charger as claimed in claim 7 in which the path of higher resistance is more than four times the resistance of the path of lower resistance.

9. A battery charger as claimed in claim 4 in which the path of higher resistance is more than four times the resistance of the path of lower resistance.

10. A battery charger as claimed in claim 1 provided with a warning light connected across the contacts of the thermo-operated switch which are closed when the switch is cold and which is illuminated when the switch is hot to indicate that the battery is connected the correct way round and is being charged.

11. A battery charger as claimed in claim 1 provided with a warning light and a diode which are connected in series across the battery connecting terminals to indicate when the battery is connected the wrong way round.

12. A battery charger as claimed in claim 1 in which said thermo-operated switch includes a movable member, and an overload cut-out in series with said movable member.

* * * * *